(12) United States Patent  (10) Patent No.: US 7,299,920 B2
Osborn et al.  (45) Date of Patent: Nov. 27, 2007

(54) PROTECTIVE CASE FOR INFORMATION STORAGE DISC

(76) Inventors: Warren R. Osborn, 4290 Vintage Cir., Provo, UT (US) 84604; Bryan P. Dunford, 598 N. 100 West #13, Provo, UT (US) 84601

( * ) Notice: Subject to any disclaimer, the term of this patent is extended or adjusted under 35 U.S.C. 154(b) by 363 days.

(21) Appl. No.: 10/757,136

(22) Filed: Jan. 14, 2004

(65) Prior Publication Data

US 2005/0150791 A1    Jul. 14, 2005

(51) Int. Cl.
*B65D 85/57*    (2006.01)

(52) U.S. Cl. .................... 206/308.1; 206/310; 220/841

(58) Field of Classification Search ............ 206/308.1, 206/310, 312, 387.13; 220/840, 841
See application file for complete search history.

(56) References Cited

U.S. PATENT DOCUMENTS

| 5,803,251 A * | 9/1998 | Gartz ........................ 206/310 |
| 5,848,689 A * | 12/1998 | Mueller ................... 206/308.1 |
| 5,890,590 A | 4/1999 | Doodson |
| 5,915,550 A * | 6/1999 | Gartz ....................... 206/308.1 |
| 5,938,021 A * | 8/1999 | Grobecker ............... 206/308.1 |
| 6,000,537 A | 12/1999 | Doodson |
| 6,264,027 B1 * | 7/2001 | Rhein et al. ............. 206/308.1 |
| 6,283,284 B1 * | 9/2001 | Crane et al. ................ 206/310 |
| 6,530,474 B1 * | 3/2003 | Rufo et al. .............. 206/308.1 |
| 7,055,688 B2 * | 6/2006 | Watson et al. ........... 206/308.1 |

* cited by examiner

*Primary Examiner*—David T. Fidei
(74) *Attorney, Agent, or Firm*—Angus C. Fox, III

(57) ABSTRACT

A three-piece jewel case for information storage discs, such as CDs and DVDs, is of the clam-shell type, and includes a base portion having a pair of generally rectangular hinge recesses positioned at adjacent corners along a rear side edge thereof, a lid portion having a pair of generally rectangular hinge arms positioned at adjacent corners along a rear side edge thereof, and a media tray having a lid portion supporting hub, which snaps into the base portion. For a preferred embodiment of the case, the media tray is hingeably connected to the base portion along the rear side edge. Each hinge arm has a rectangular solid component that extends from the outer edge to the inner edge and from the front edge to the back edge thereof. This feature rigidifies the rectangular hinge so that it is much more resistant to mechanical damage from crushing or dropping loads.

18 Claims, 10 Drawing Sheets

PROTECTIVE CASE FOR INFORMATION STORAGE DISC

BACKGROUND OF THE INVENTION

1. Field of the Invention

The invention relates generally to protective cases for storing and shipping disc-shaped information storage media such as compact discs and digital video disks and, more particularly to protective jewel cases of a clam-shell design comprising an assembly of three pieces: a bottom cover piece, a top cover piece hingeably connected to the bottom cover piece, and an internal swing-out piece hingeably connected to the bottom cover piece.

2. History of the Prior Art

The use of optically-scannable discs for high-density storage of digital data has exploded since the advent of the compact disc (CD) in 1983. Capable of storing 650 to 700 megabytes of digital data, a single CD could hold 74 to 80 minutes of high-quality music. Fourteen years later, the digital video disc (DVD) was introduced. Although a DVD is identical in thickness (1.2 millimeters) and diameter (120 millimeters or 4.7 inches) to a standard CD, the DVD's storage capacity is seven times that of a CD, with a 4.7-gigabyte capacity on a single-side, single-layer DVD. Ninety-five percent of all movies are 133 minutes or less in length, and fit comfortably on a such a DVD. A single-side, dual layer DVD has nearly double the capacity (8.5 GB), and a double-sided, dual-layer DVD has nearly four times the capacity (17 GB). The DVD is an ideal storage medium for not only movies, but for high-definition computer games and multimedia applications, as well.

Pressed CDs and DVDs are manufactured using very similar processes. In order to produce a pressed CD or DVD, polycarbonate plastic is injected into a mold containing a negative master disc. As the disk must reflect laser light, a gold, silver, copper or aluminum layer of about 50 to 100 nanometers in thickness is then applied to the pressed surface via sputtering or vacuum deposition. Because it is the least expensive, aluminum is used for virtually all prerecorded pressed discs. When greater reflectivity is required for recordable disks, gold or silver is used. A thin layer of acrylic plastic is then applied on top of the metal layer by spin coating. After it is cured in ultraviolet light, the acrylic plastic protects the metal layer from scratches and corrosion. Extra protective or printer-friendly coatings may also be subsequently spun on. Because the degree of mechanical damage protection provided by the acrylic plastic layer is fairly minimal, CDs and DVDs are relatively fragile and must be handled with care in order to ensure their longevity.

The ideal case should have a manufacturing cost that is considerably less than that of the CD or DVD which it protects. It should also be sufficiently durable so that, if given reasonable care, will last as long as the CD or DVD. Reasonable care must include frequent openings and closings, occasional dropping, as well as rough handling during shipping and processing on an automated assembly line. The ideal case must also be capable of retaining and displaying labels which identify or advertise the CD or DVD contained therein. Manufacturers, merchants and consumers have demonstrated a preference for cases which are compact and easily stored. The size for 3-piece polystyrene jewel cases has become standardized at 142 mm×125 mm×10 mm.

The ubiquitous clam-shell-type jewel case that was developed to protect CDs during display, shipment and storage is a design compromise. Each case is injection molded from polystyrene as three separate components: a top half, or lid; a bottom half, which hingeably interconnects with the lid; and an inner tray, which snaps into the bottom half and holds the CD. Though the polystyrene used to fabricate the cases is quite brittle, its crystal clarity makes it an idea material for the display of labels secured within the case. Though cases made from impact resistant polyethylene and polypropylene have been manufactured, they lack the clarity of the polystyrene cases. Consequently, they are rarely used as original retail cases. Though half-thickness CD cases are also now available, the display of labels is limited to the upper half, as the lower half and media tray are unitary.

Though standard polystyrene jewel cases continue to be used for the packaging of pressed CDs, a different format has become standard for DVDs. While maintaining the same width and thickness as the standard CD jewel case at 142 mm and 10 mm, respectively, the height has increased to 191 mm. Presumably, the increase in height was ordained to accommodate a larger internal booklet. Typically, the DVD cases are injection molded from polyethylene or polypropylene material. Although the durability of the cases is enhanced, the cost is increased because clear plastic sheet material must be heat bonded to the outer surface of the case to form slip pockets. In addition, printed paper labels must be inserted into the pockets. Thus, appearance and low cost have taken a back seat to durability.

One of the problems associated with the standard jewel CD case is the vulnerability of the cover hinge arms to mechanical damage. Given the inherent weakness of the standard case, it is absolutely amazing that the design has remained unchanged for more than twenty years.

U.S. Pat. No. 5,890,590 to Peter J. Doodson discloses jewel cases featuring improved hinge design for standard-size CD and DVD cases. Each of the cases has a pair of recessed hinge arms and a pair of corresponding recessed hinge walls. Each hinge arm has an inner wall with a first pivot component and a parallel outer protective wall. Each recessed hinge wall has a second pivot component that mates with a first pivot component on an associated hinge arm.

SUMMARY OF THE INVENTION

The present invention has for its object the provision of an improved, three-piece protective jewel case for disc-shaped information storage media. The case, which is of the clam-shell type, is preferably injection molded from optically transparent polymeric plastic material, and includes a base member having a pair of generally rectangular hinge alcoves positioned at adjacent corners along a rear side edge thereof, a lid member having a pair of generally rectangular hinge arms positioned at adjacent corners along a rear side edge thereof, and a media tray which snaps into the base member. For a preferred embodiment of the case, the media tray is hingeably connected to the base member along the rear side edge. The hinge arms differ from those of the '590 patent in that, rather than being a vertical rectangular tube closed at one end, each hinge arm has a rectangular solid component in the pivot plane that extends from the outer edge to the inner edge and from the front edge to the back edge thereof. This feature rigidifies the rectangular hinge so that it is much more resistant to mechanical damage from crushing or dropping loads. Other significant features of the improved storage case are thicker walls; stronger corners; a hub and outer ring on the media tray having heights sufficient to support the lid when the latter is subjected to crushing loads; multiple, spaced-apart posts on the spine of the media tray, which support the rear edge of the lid member; double, spaced-apart, positive locking tabs positioned along the front edge of the case; a wide finger opening between the lid member and the base member, which facilitates opening the case; a base member which nests inside the lid member; a thick ridge around the edges of the case for increased structural strength; clear edges for an unobstructed view of graphic inserts; and at least a pair of finger recesses on the ring of the media tray to facilitate removal of a stored disc.

A preferred embodiment of the housing according to the invention has the characteristic that for each corner hinge either the hinge arm or the hinge wall is provided with a stud which projects into a circular opening in the associated mating hinge component. The hinge arms and the hinge alcoves are thus hingeably coupled to one another as is well known in the prior art of jewel cases. To facilitate the fastening of the lid member to the base member, the hinge arms are preferably resilient in directions that permit them to be pulled apart from one another a distance sufficient for the studs of the lid member to engage the openings in the base member, without fracturing the lid member. After assembly, the resilient hinge arms return to their original position, thereby ensuring that the studs remain locked in the openings. Alternatively, the base member can be temporarily distorted to narrow the distance between the openings, or both components may be temporarily distorted to lessen the assembly stresses on a single component. The media tray is coupled to the base member in a like manner using pivots and mating openings.

Three configurations of media trays or base member inserts are contemplated by the present invention. All three configurations, or embodiments, preferably incorporate multiple posts along a rear stiffening rib that help support the rear edge of the lid member. The first configuration is a partial media tray, which includes a disc mounting region, a hub to secure the center of the disc, and sufficient appendages to secure it to the base member. The second is a full media tray which covers essentially the entire area of the base member. The third is simply a rib, which provides rigidity to the base member and helps support the rear edge of the lid member.

The polymeric plastic material from which the case is injection molded is selected preferably from the group consisting of polystyrene, styrene acrilonitrile, or polycarbonate, with polystyrene being the weakest and least expensive of the three materials, and polycarbonate being the most expensive (currently about double the cost of polystyrene) and strongest of the three. When low cost and reasonable strength are both significant product factors, styrene acrilonitrile is good choice. Currently, the material costs less than ten percent more than polystyrene. Protective jewel cases made from styrene acrilonitrile in accordance with the present invention have sufficient impact resistance to be mailed without external packaging. Although it is assumed that a small percentage of the cases will be damaged in the mailing process, it is believed that an overwhelming great majority will arrive at their destination without damage.

DETAILED DISCLOSURE OF THE INVENTION

Several embodiments of a new protective jewel case for optically-scannable, disc-shaped information storage media, fashioned in accordance with the present invention, will now be described with reference to the attached drawing FIGS. 1 through 14.

Figure 1:
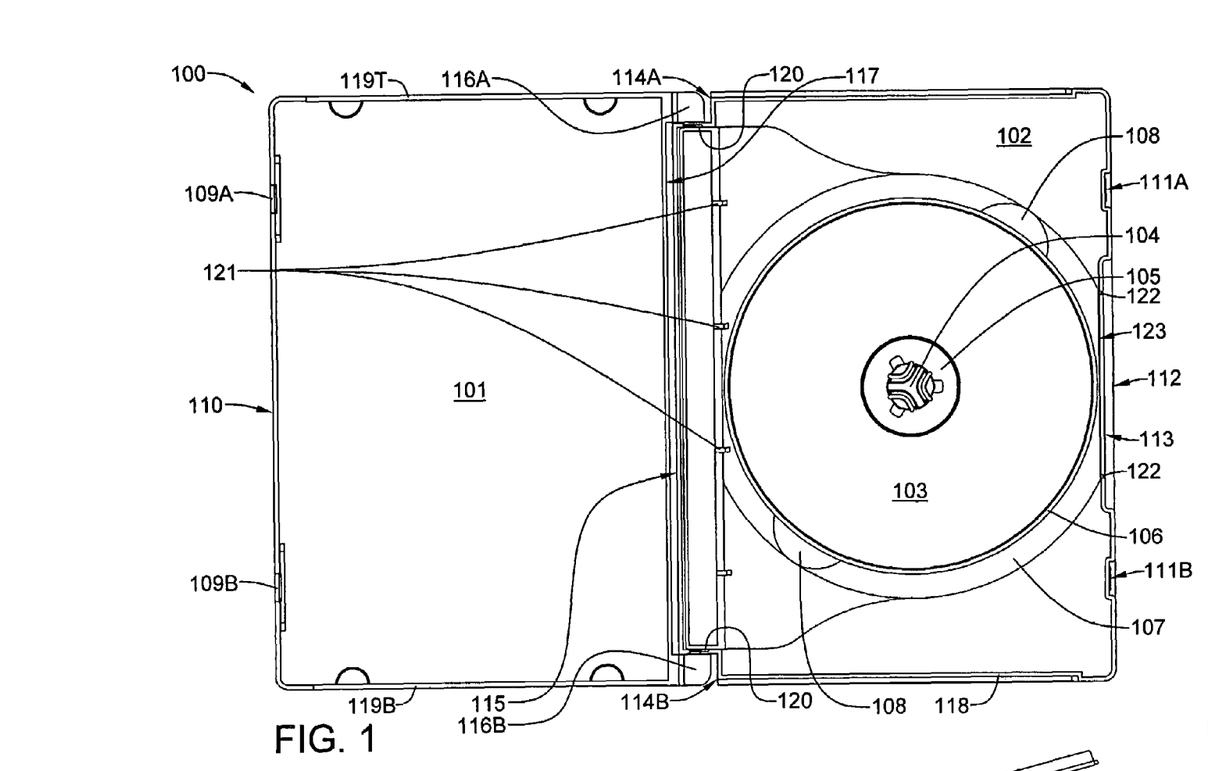
FIG. 1 is a plan view of a first embodiment of a jewel case assembly for a disk-shaped information storage medium, according to the invention, showing the interior thereof in an open state.

Referring now to FIG. 1, a first embodiment circular media jewel case 100 assembly is assembled from three discrete injection molded pieces, namely, a lid member 101, a base member 102, and a first embodiment media tray 103. The first embodiment media tray 103 has a hub 104, which securely retains an information storage disc, such as a CD or DVD. A number of significant features are visible in this open-case view. It will be noted that the hub 104 includes a shoulder 105 that supports the central portion of a storage disc. A lip 106 supports the outer periphery of a storage disc. Both the hub 104 and an elevated circular protector ring 107, which surrounds the storage medium, are of sufficient height to protect the storage disc and protect the lid member 101 from excess deflection and cracking when the jewel case 100 is subjected to crushing loads. It will be noted that the circular protector ring 107 has a pair of finger depressions 108, which facilitate removal of a storage disc from the hub 104. The lid member 101 incorporates four inner tabs, which allow a booklet or jacket to be retained against the inner surface of the lid member 101. The lid member 101 also incorporates a pair of clasps 109A and 109B which are spaced apart along the front edge 110 thereof. When the lid member 101 is closed against the base member 102, each of these clasps 109A and 109B resiliently respectively engage an associated recessed receptacle 111A and 111B, which are located on the front edge 112 of the base member 102. A finger recess 113, which is centered on the front edge 112 of the base member 102 between receptacles 111A and 111B, facilitates the separation of the lid member 101 from the base member 102 when the lid is top be opened. It will be noted that the first embodiment media tray 103 does not completely fill the rectangular space of the base member 102. Rather, its shape is only large enough to hold an information storage disk and to attach it to the base member 102. The reduced size of media tray 103 not only reduces material costs during manufacture, but also reduces mailing weight. The only potential disadvantage is that media tray 103 may not completely cover a paper tray insert (not shown) that is positioned inside the case 100 between the media tray 103 and the base member 102.

Still referring to FIG. 1, it will be noted that the base member 101 incorporates a pair of hinge alcoves 114A and 114B, which are located at opposite ends of the rear edge 115 of the base member 102. It will also be noted that the lid member 101 incorporates a pair of hinge arms 116A and 116B located at opposite, adjacent corners on the rear edge 117 of the lid member 101. The lid member 101 and the base member 102 are hingeably coupled via a system of axially-aligned studs and apertures. For the preferred embodiment, each of the hinge alcoves 114A and 114B incorporates a cylindrical aperture that is axially aligned with the cylindrical aperture of the other hinge alcove. Each of the hinge arms 116A and 116B incorporates a pivot stud that is axially aligned with the pivot stud of the other hinge arm. By slightly distorting the lid member 101, the base member 102, or both, the lid member 101 can be pivotally attached to the base member 102. It will be further noted that the base member 102 incorporates a perimetric wall 118 that is adjacent the outer edges of the base member 102. It will be noted that this perimetric wall 118 is offset slightly from the outer edge at the top and bottom so that it may be overlapped by top and bottom lateral walls 119T and 119B, respectively, of the lid member, when the lid member 101 is closed on top of the base member 102. It will be further noted that the perimetric wall 118 is also offset from the outer edge where the recessed receptacles 111A and 111B are located, and is further offset to create the finger recess 113. The media tray 103 is hingeably connected to the base member 102 by means of a pair of pivot pins 120 located on the media tray 103 and a pair of spaced apart openings, each of which is located in a portion of the perimetric wall 118 that forms one of the hinge alcoves 114A and 114B. The first embodiment media tray 103 also includes a plurality of lid member support posts 121 that support the rear edge of the lid member 101 when the latter is closed over the base member 102. A pair of nipples 122 on the front edge 123 of the media tray 103 engage corresponding indentations (not visible in this view) on the inside of a portion of the perimetric wall 118 that forms the finger recess 113, enabling the media tray 103 to lock into position within the base member 102.

Figure 2:
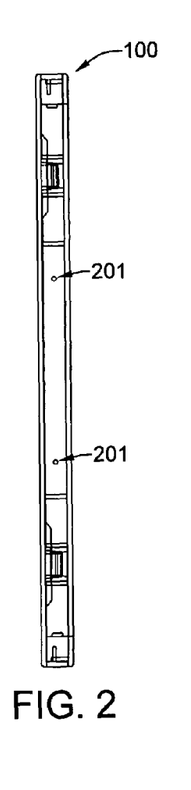
FIG. 2 is a front elevational view of the non-hinged edge of the first embodiment jewel case in a closed state.

Referring now to FIG. 2, the jewel case 100 is shown in this front elevational view in a closed configuration. Features already identified in FIG. 1 are labeled identically in this drawing. The pair of indentations 201 which engage the nipples 122 of the media tray are also visible in this view.

Figure 3:
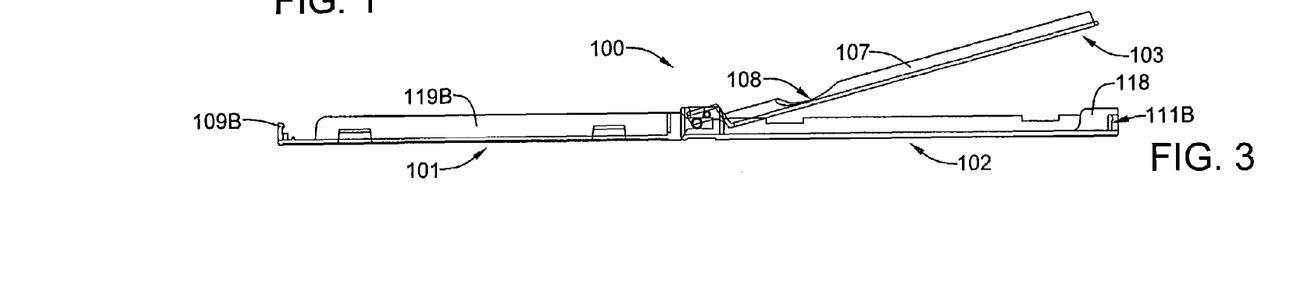
FIG. 3 is a side elevational view of the first embodiment jewel case in an open state, with the inner media tray rotationally elevated above the lower half thereof.

Referring now to FIG. 3, the jewel case 100 is shown in an open configuration with the media tray 103 rotatably elevated above the base member 102. Once again, features already identified in FIG. 1 are labeled identically in this drawing.

Figure 4:
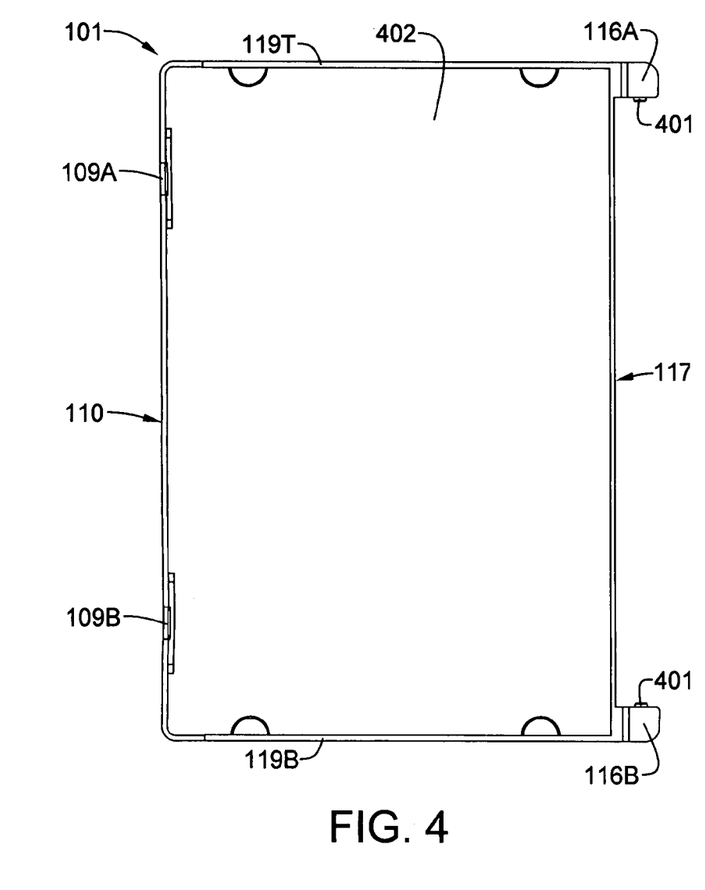
FIG. 4 is a plan view of the upper half of the first embodiment jewel case.

Referring now to FIG. 4, the lid member 101 is shown separately from the base member 102 and the media tray 103. In the description of FIG. 1, the hingeable interconnection system of axially aligned studs and cylindrical apertures was described, but not designated in the drawing because the features were not particularly clear in that drawing figure. However, in this view, the axially-aligned studs 401 are clearly visible.

Figure 5:
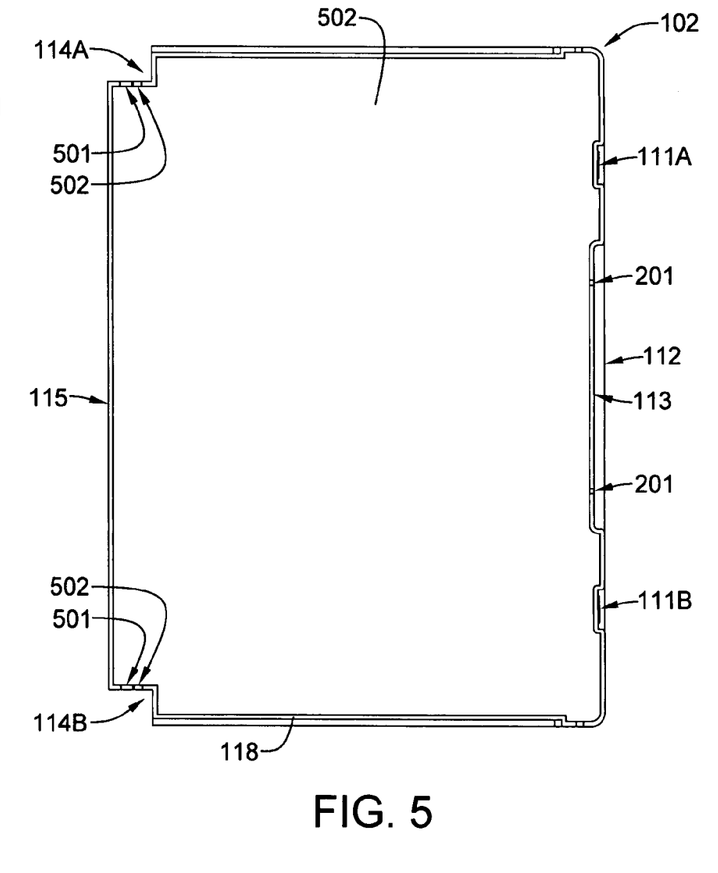
FIG. 5 is a plan view of the lower half of the first embodiment jewel case.

Referring now to FIG. 5, the base member 102 is shown separately from the lid member 101 and the media tray 103. In this view, the axially aligned cylindrical apertures 501 are clearly visible because the base member 102 is injection molded preferably of polystyrene plastic compound. It should be clear that, although regular polygonal (e.g., triangular, square, pentagonal, hexagonal, etc.) tubular apertures might be substituted for the cylindrical apertures 501, cylindrical apertures 501 are preferred because they have the greatest bearing area and will not wear as rapidly. Also visible in this view are a pair of axially aligned-openings 502, which pivotally engage the pivot pins 121 on the media tray 103. The pair of indentations 201 which engage the nipples 122 of the media tray are also visible in this view.

Figure 6:
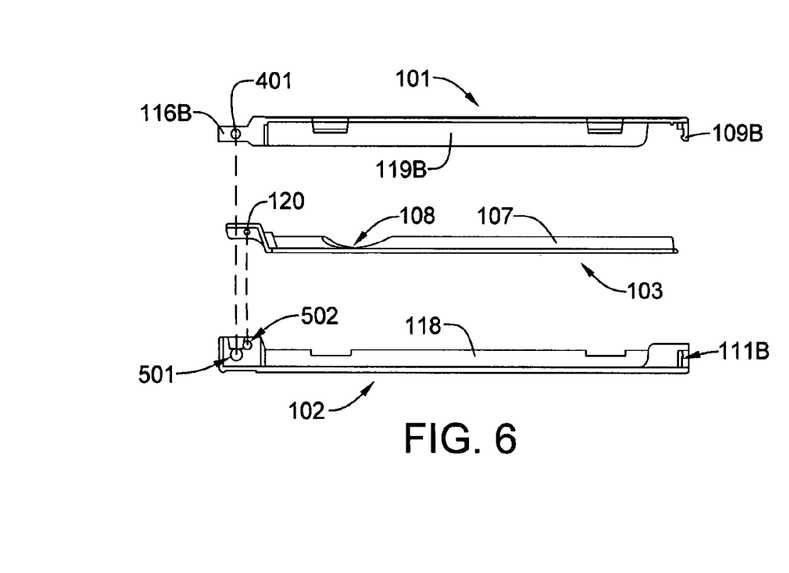
FIG. 6 is a side elevational exploded view of the first embodiment jewel case assembly.

Referring now to FIG. 6, this exploded view of the jewel case assembly 100 shows how the pieces are assembled, how the studs 401 align with the apertures 501, and how the pivot pins 121 align with the axially-aligned openings 502.

Figure 7:
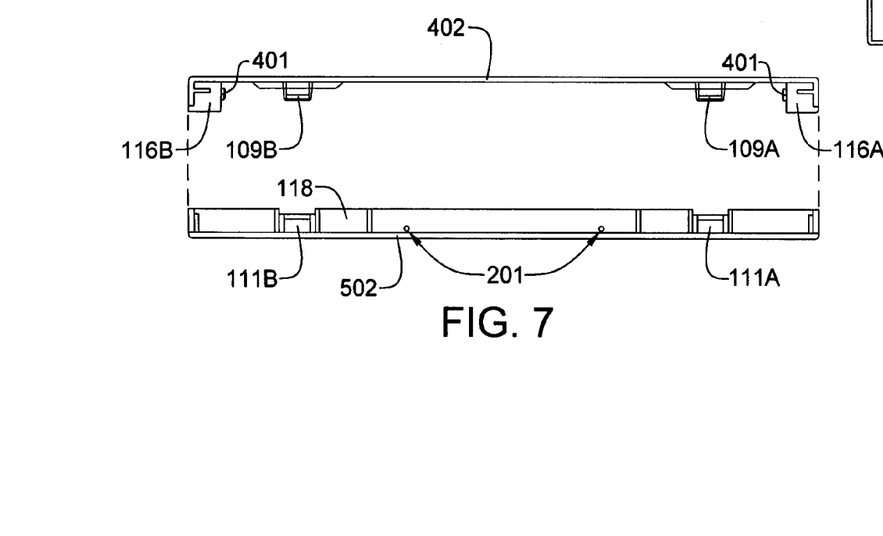
FIG. 7 is a front elevational exploded view of the first embodiment jewel case assembly.

Referring now to FIG. 7, this exploded view of the lid member 101 and the base member 102 indicates the alignment of the two pieces when they are assembled. Once again, features already identified in FIG. 1 are labeled identically in this drawing.

Figure 8:
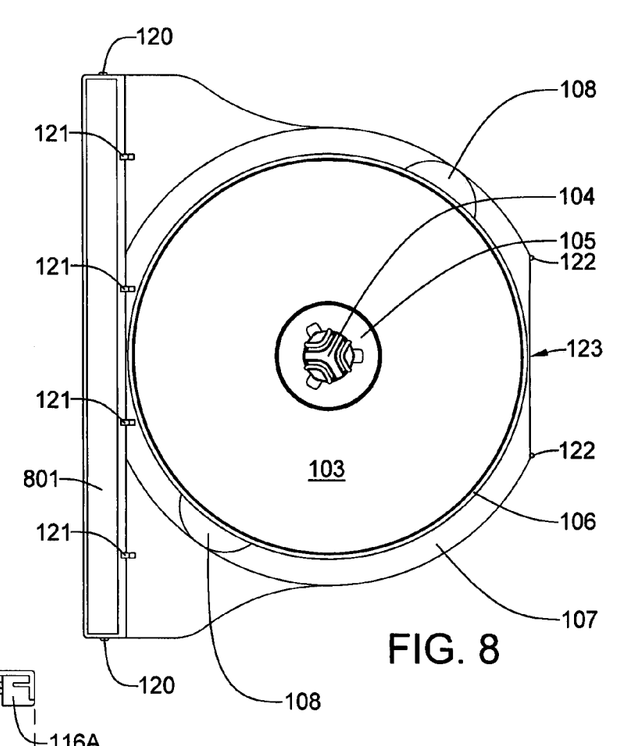
FIG. 8 is a top plan view of a first embodiment media tray.

Referring now to FIG. 8, the first embodiment media tray 103 is shown separately from the lid member 101 and the base member 102. The labeling of features corresponds to the earlier labeling of the same features.

Figure 9:
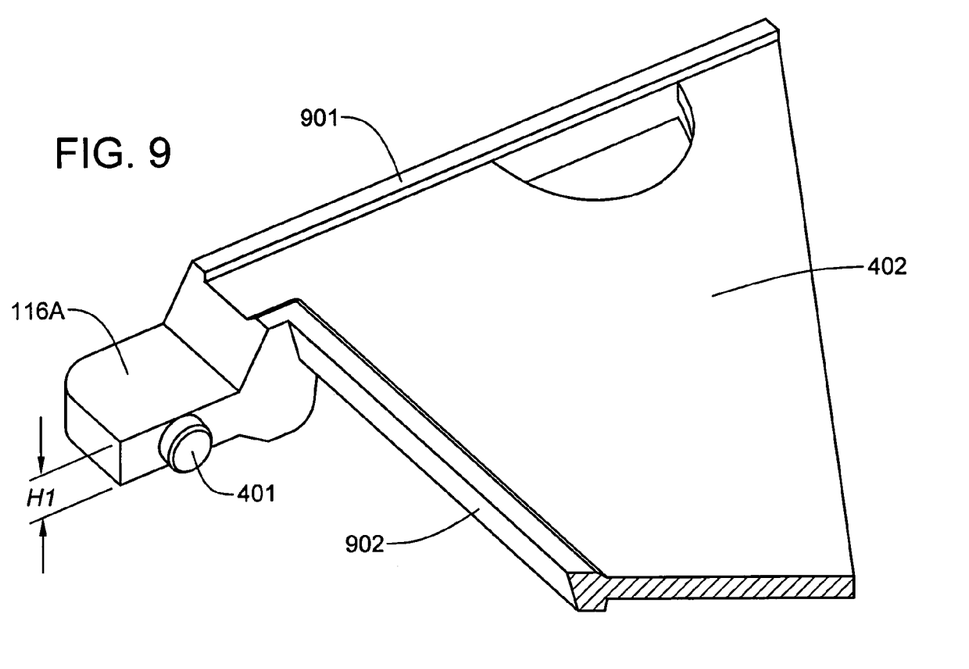
FIG. 9 is a close-up, top/inner-side perspective view of a first embodiment outer hinge element, as used on the first embodiment jewel case.
Figure 10:
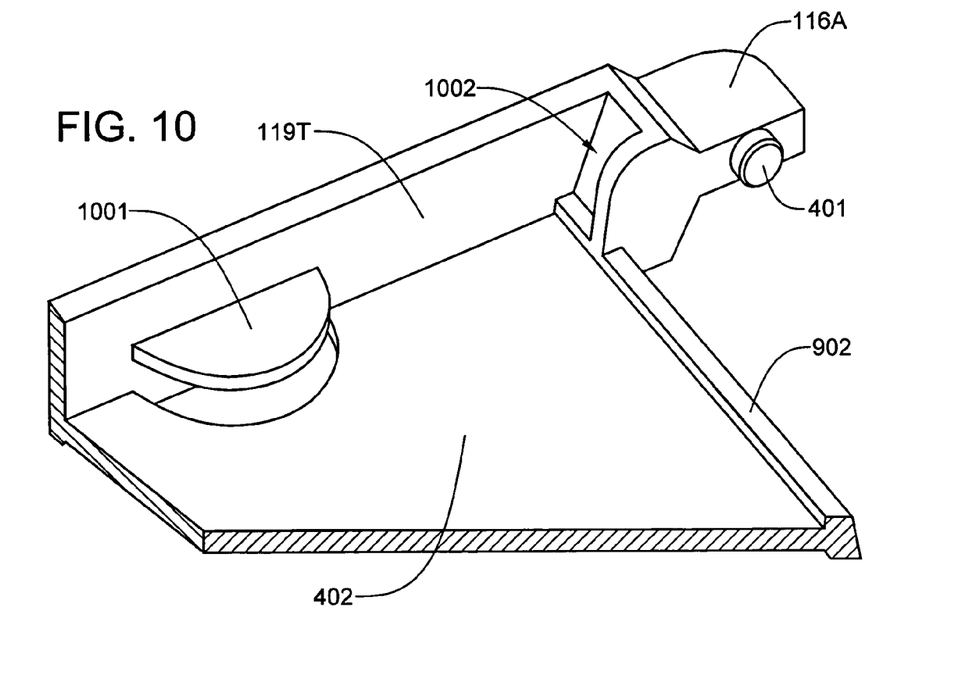
FIG. 10 is a close-up, bottom/inner-side perspective view of the first embodiment outer hinge element.

Referring now to FIGS. 9 and 10, the first embodiment hinge arm 116A (hinge arm 116B is a mirror image of hinge arm 116A) is the same as that used for the first embodiment jewel case assembly shown in FIGS. 1 to 7. It will be noted that each hinge arm is injection molded to be of solid material. In order to promote rapid cooling of the injected molded piece, the hinge arm 116A has been tapered, thereby reducing its height H1, mass and volume. It will be noted that H1 is substantially less than the full height of the jewel case 100. In addition, additional polymeric plastic material is eliminated from the hinge arm 116A near the outer edge of the lid member 101 by creating a recess 901.

Figure 11:
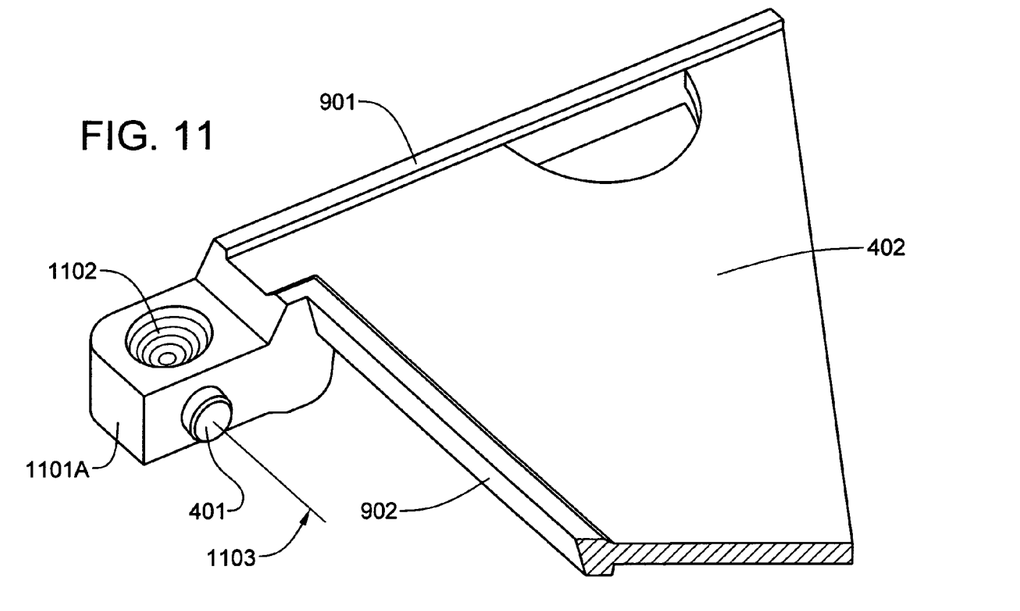
FIG. 11 is a close-up, top/inner-side perspective view of a second embodiment outer hinge element.
Figure 12:
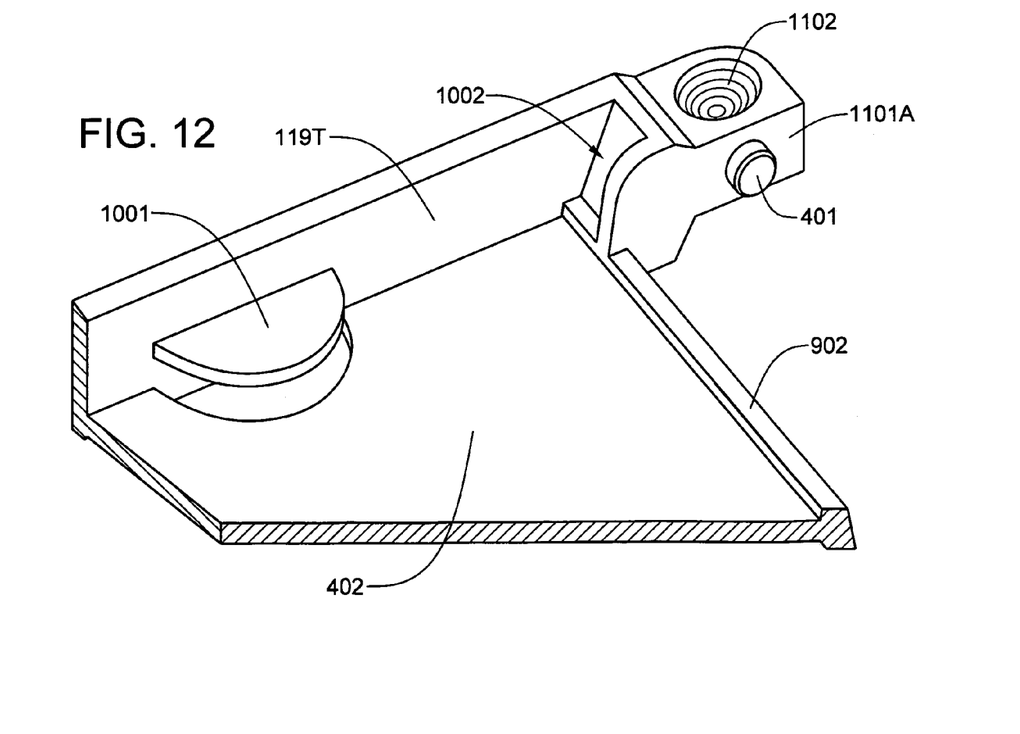
FIG. 12 is a close-up, bottom/inner-side perspective view of the second embodiment outer hinge element.

Referring now to FIGS. 11 and 12, the hinge arm 116A of FIGS. 9 and 10 has been modified to remove additional polymeric plastic material by forming dimples in the upper and lower surfaces thereof. The modified second embodiment hinge arm 1101A is still solid from side to side through the pivot axis 1103.

Figure 13:
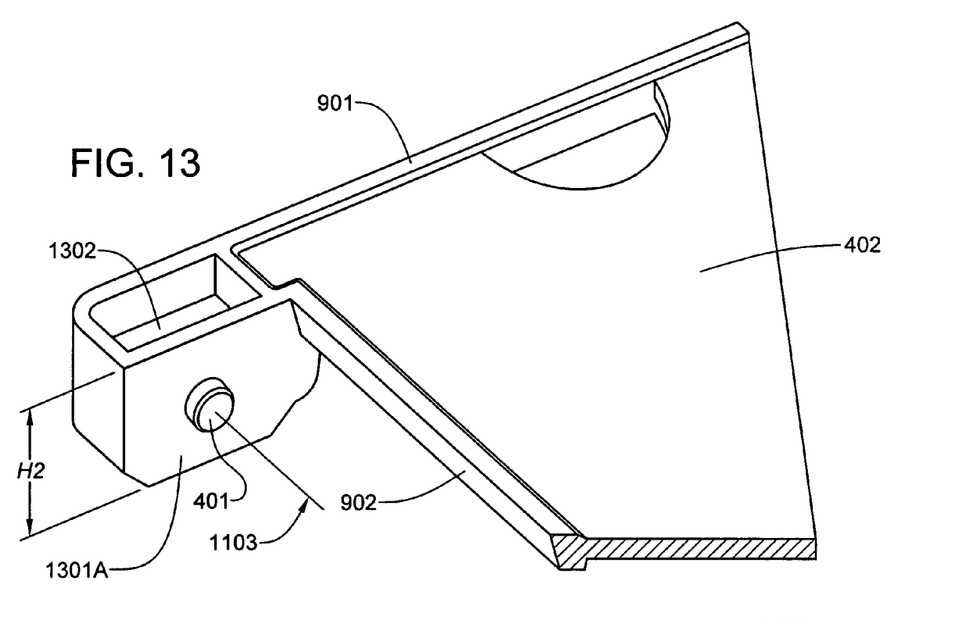
FIG. 13 is a close-up, top/inner-side perspective view of a third embodiment outer hinge element.
Figure 14:
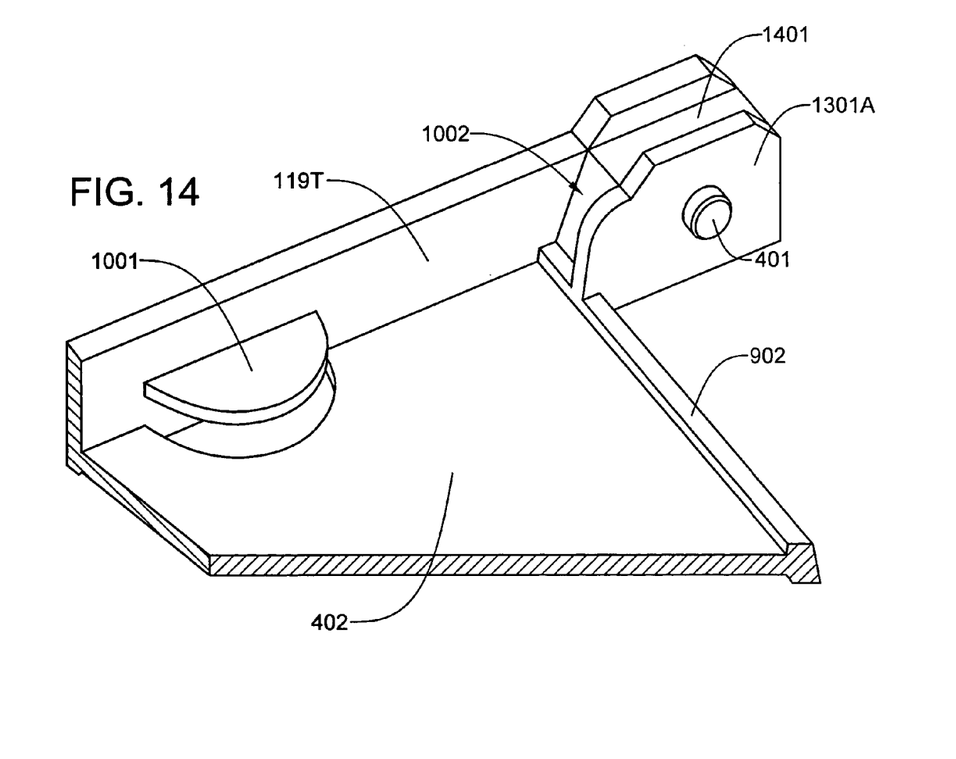
FIG. 14 is a close-up, bottom/inner-side perspective view of the third embodiment outer hinge element.

Referring now to FIGS. 13 and 14, a third embodiment hinge arm 1301A retains the full height H2 of the jewel case.

However, polymeric plastic material has been removed in the well 1302 shown in FIG. 13 and in the valley 1401 shown in FIG. 14. Nevertheless, the third embodiment hinge arm 1301A is still solid from side to side through the pivot axis 1103.

Figure 15:
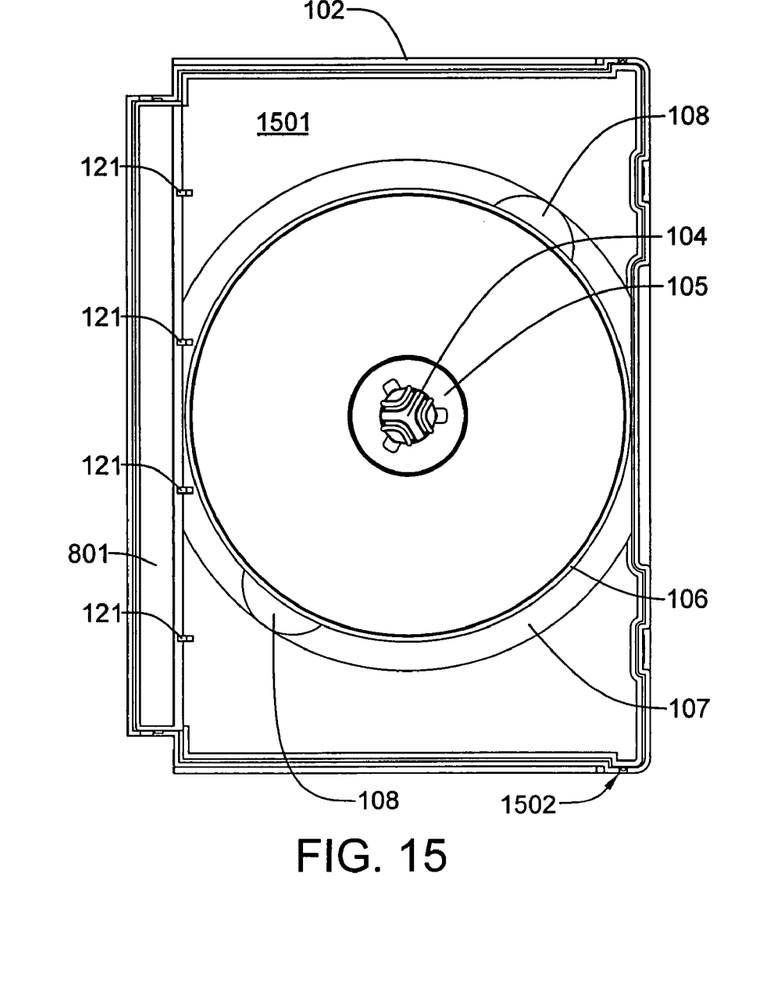
FIG. 15 is a top plan view of an assembly consisting of the base member and a second embodiment media tray.
Figure 16:
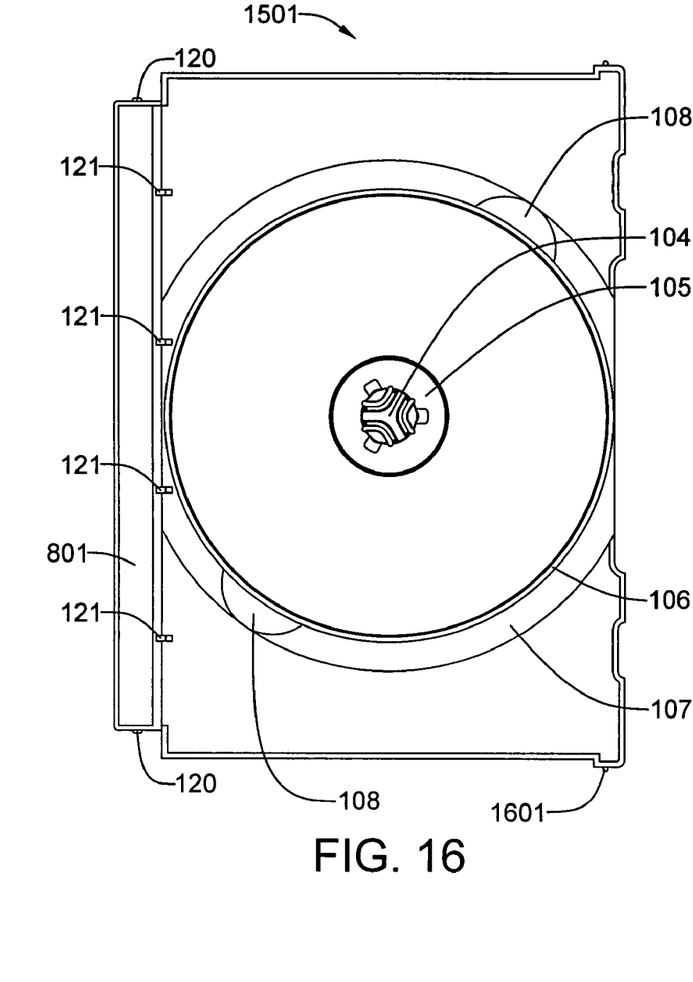
FIG. 16 is a top plan view of only the second embodiment media tray.

Referring now to FIGS. 15 and 16, a second embodiment media tray 1501 completely covers the inner surface of base member 102. This may be an advantageous feature when a paper base member insert or label is used, as media tray 1501 will completely cover a full-size insert. Other than size, the primary difference between the first embodiment media tray 103 and the second embodiment media tray 1501 is that the tray securing nipples 122 of the former have been replaced with a new set of corner-mounted tray securing nipples 1601. An extra set of corner-mounted indentations 1502, which engage the corner-mounted tray securing nipples 1601 may be provided in the base member 102. In FIG. 15, it can be seen how the nipples 1601 fit into the corner-mounted indentations 1502. It should be clear that the base member 102 may be manufactured with two set of indentations 125 and 1502 which will accommodate both the first and second embodiment media trays 103 and 1501, respectively.

Figure 17:
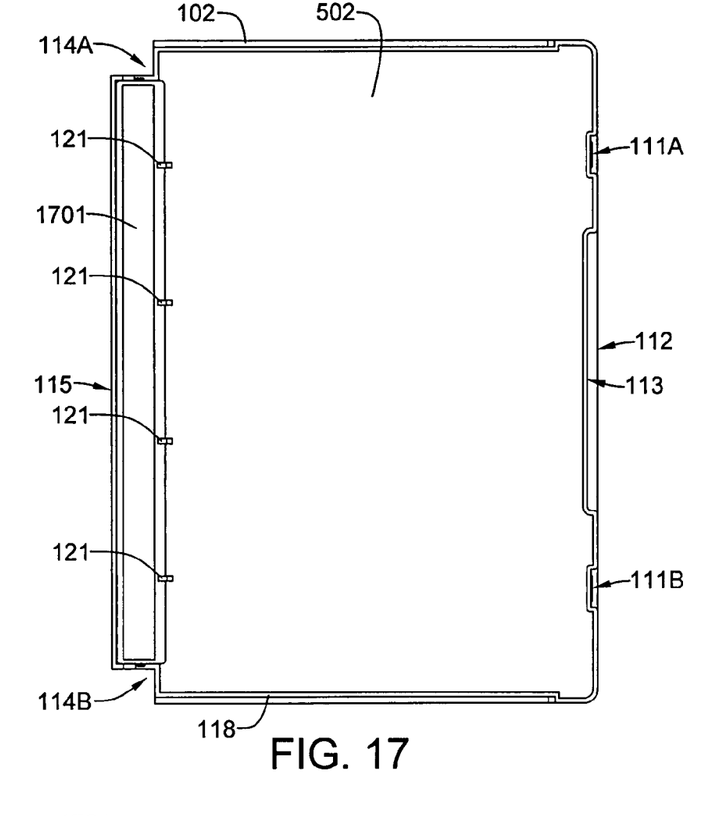
FIG. 17 is a top plan view of an assembly consisting of the base member and a reinforcing rib, which may be substituted in place of a media tray.
Figure 18:
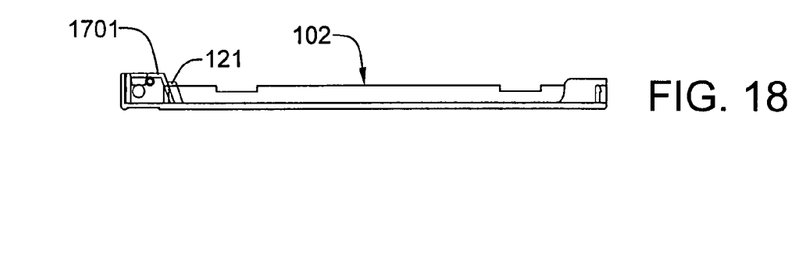
FIG. 18 is a side elevational view of the assembly of FIG. 17.

Referring now to FIGS. 17 and 18, a reinforcing rib 1701 is shown installed within a base member 102. The reinforcing rib 1701 replaces the media tray 103 or 1501 and may be used when it is desired that an enclosed media disc be packed loosely within the protective jewel case.

Figures 19, 20:
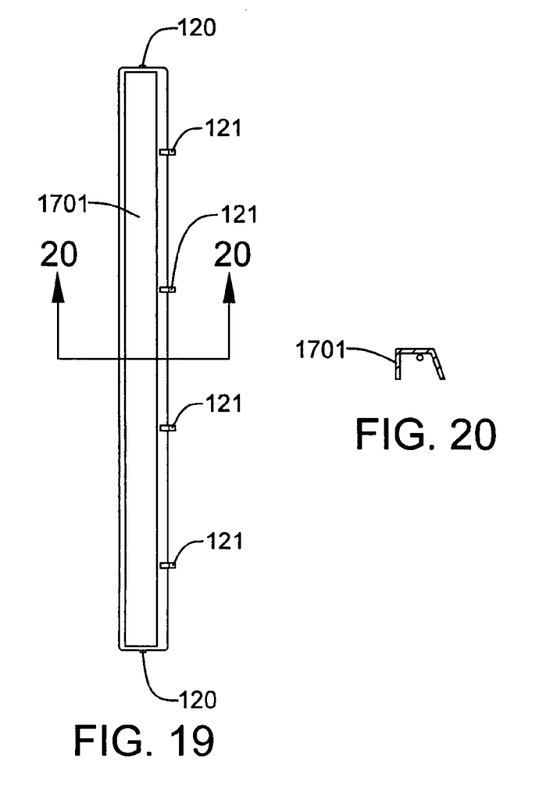
FIG. 19 is a top plan view of only the reinforcing rib of FIG. 17.
FIG. 20 is a cross-sectional view of the reinforcing rib of FIG. 18, taken through line 20-20.

Referring now to FIGS. 19 and 20, the reinforcing rib 1701 is shown alone, with FIG. 19 being a top view, and FIG. 20 being a cross-sectional view thereof.

Figure 21:
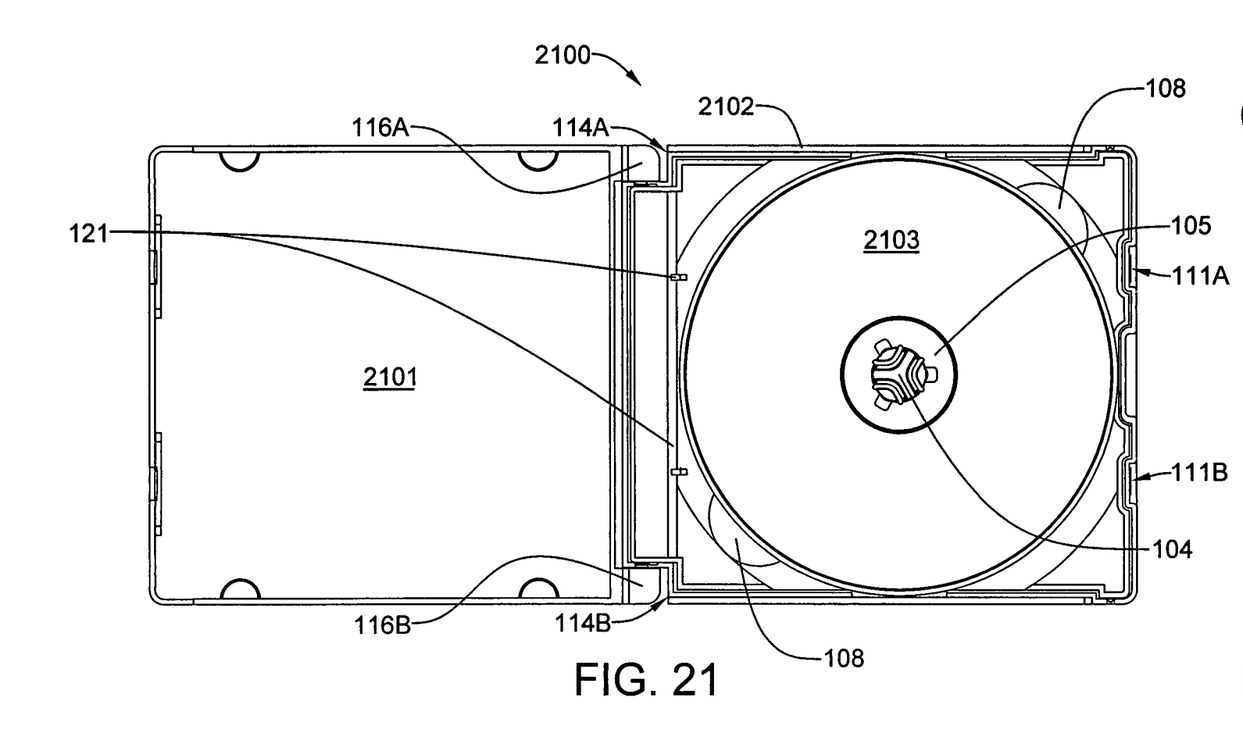
FIG. 21 is a plan view of a second embodiment of a jewel case assembly for a disk-shaped information storage medium, according to the invention, showing the interior thereof in an open state.
Figure 22:
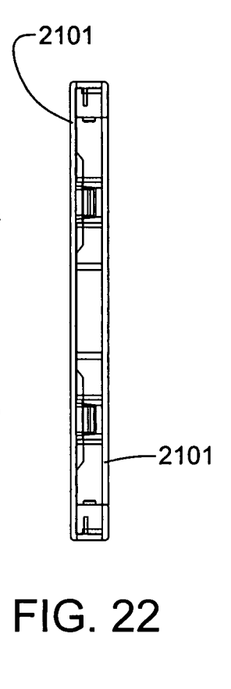
FIG. 22 is a front elevational view of the non-hinged edge of the second embodiment jewel case in a closed state.

FIGS. 21 and 22 show a second embodiment protective jewel case 2100 for optically scannable information media disks jewel case according to the present invention. This particular case includes the features of the first embodiment case 100, with the difference being that it is sized according to the standard jewel cases for CDs. The smaller media tray 2103 is secured to the small base member 2102, which is hingeably attached to the small lid member 2101.

Figure 23:
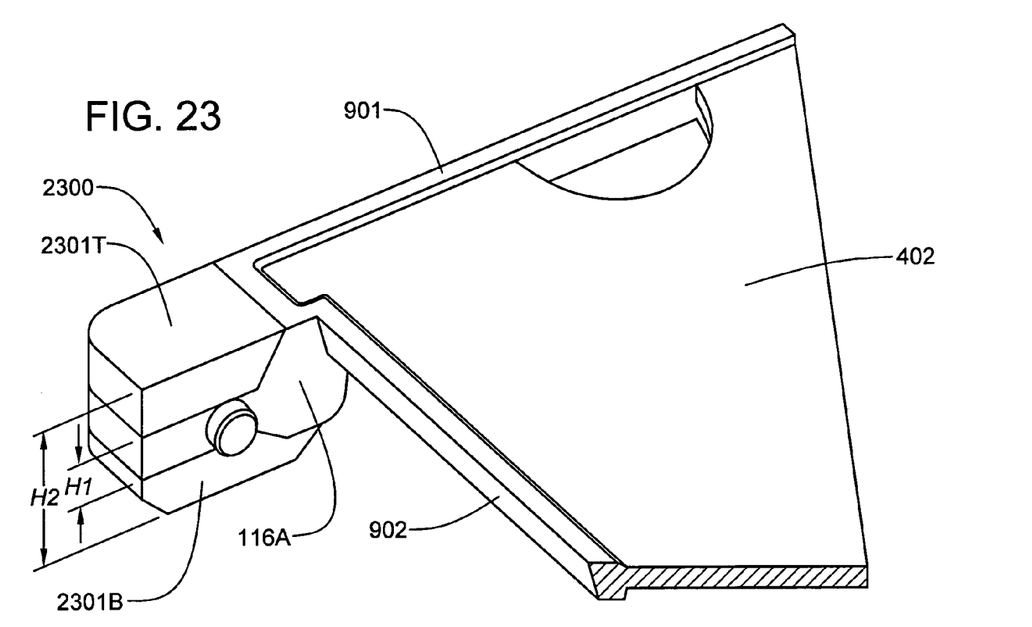
FIG. 23 is a close-up, top/inner-side perspective view of a fourth embodiment outer hinge element.
Figure 24:
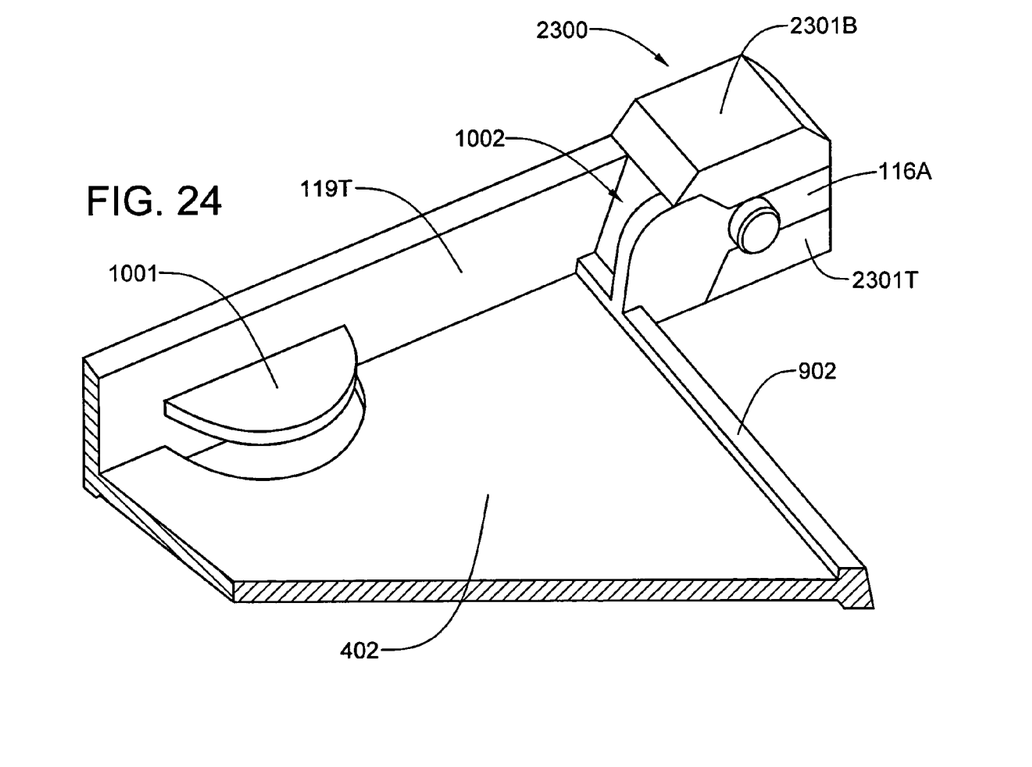
FIG. 24 is a close-up, bottom/inner-side perspective view of the fourth embodiment outer hinge element.

Referring now to FIGS. 23 and 24, a fourth embodiment hinge arm 2300 is a composite of the first embodiment hinge arm 116A/116B and additional resilient rubber pads 2301T and 2301B, which are added to the top and bottom, respectively, of the first embodiment hinge arm 116A/116B in a further injection molding process. The resilient rubber pads 2301T and 2301B further protect the hinge arm from shattering and may be colored for a custom effect. It will be noted that the completed fourth embodiment hinge arm 2300 has a thickness of H2, which is the full height of the protective case 100, with the resilient rubber pads 2301T and 2301B making up the difference between the H1 thickness and the H2 thickness.

It should be noted that the invention is not limited to the embodiments shown. For example, the placement of studs 401 and apertures 501 may be reversed, as may be the placement of pivot pins 118 and pivot openings 501. In addition, the shape of the media tray 103 may cover the entire base member 102, rather than only a portion thereof.

It is also possible for the housing to be specifically adapted to different types of disc-shaped information carriers, that need not necessarily be disc shaped. For example, they might be rectangular, as are the business-card-size CDs which have become popular.

Although only a single embodiment of the present invention has been disclosed herein, it will be obvious to those having ordinary skill in the art that changes and modifications may be made thereto without departing from the scope and spirit of the invention as hereinafter may be claimed.

What is claimed is:

1. A protective case for storing an information storage medium, said protective case comprising:
 a base member having:
  a generally rectangular lower panel;
  a generally perimetric wall adjacent the outer edges of said lower panel, said perimetric wall being generally perpendicular to and unitary with said bottom panel; and
  a pair of hinge alcoves positioned at adjacent corners of the bottom panel and at opposite ends of a rear portion of the perimetric wall, each hinge alcove having a first pivot element that is axially aligned with the first pivot element of the other hinge alcove, each hinge alcove being recessed from an adjacent outer edge at said lower panel that is perpendicular to said rear portion of the perimetric wall an amount that is at least five times the average thickness of said perimetric wall;
 a lid member having:
  a generally rectangular upper panel;
  top and bottom lateral walls adjacent top and bottom outer edges of said upper panel, said lateral walls being generally perpendicular to and unitary with said upper panel;
  a pair of hinge arms positioned at adjacent corners along a rear edge thereof, each hinge arm having a second pivot element that is axially aligned with the second pivot element of the other hinge arm the second pivot element of each of said hinge arms engaging the first pivot element of one of the hinge alcoves so as to hingeably interconnect said lid member to said base member, each hinge arm being unitary with said upper panel, having a width measured along an axis of pivot alignment that is about equal to the amount that each hinge alcove is recessed, each hinge arm being solid from side to side through said axis of pivot alignment, and each hinge arm fitting within a hinge recess when said lid member is closed over said base member; and
 an information storage medium tray that snaps into space within said base member.

2. The protective case of claim 1, wherein each hinge alcove is recessed from an adjacent outer edge of said lower panel that is perpendicular to said rear portion of the perimetric wall, an amount that is about ten times the average thickness of said perimetric wall.

3. The protective case of claim 1, wherein said information storage medium tray is hingeably connected to said base member between said pair of hinge alcoves.

4. The protective case of claim 1, wherein said information storage medium tray has a hub which has a height sufficient to centrally support said upper panel so that it is less easily deformed to the point of cracking.

5. The protective case of claim 1, wherein said information storage medium tray has a circular protector ring, which surrounds a disc storage space and has a height sufficient to support said upper panel so that is less easily deformed to the point of cracking.

6. The protective case of claim 1, wherein each of said first hinge elements is an aperture that engages one of said second hinge elements, each of said second hinge elements being a stud.

7. The protective case of claim 1, wherein said perimetric wall overlaps said top and bottom lateral walls.

8. The protective case of claim 1, wherein said information storage medium tray includes a plurality of lid member support posts that support the rear edge of the lid member when the latter is closed over the base member.

9. A protective case for storing an information storage medium, said protective case comprising:
- a base member injection molded from polymeric material as a single piece, comprising intersecting panels of generally uniform standard thickness, and having a pair of hinge alcoves which are positioned at adjacent corners along a lower rear edge thereof, each alcove inset from a top or bottom edge of said base member by a distance that is at least five time the thickness of the intersecting panels;
- a lid member molded as a single piece, having an upper rear edge, formed predominantly of intersecting panels of said generally uniform standard thickness, in addition to a pair of hinge arms positioned at opposite ends of said upper rear edge, each hinge arm pivotally connected to an alcove of said base member along a pivotal axis passing through both alcoves, and each hinge arm being solid from side to side through the pivotal axis, and having a width, measured along said pivotal axis, that is about equal to the amount that each hinge alcove is recessed from a top or bottom edge; and
- an information storage medium tray which snaps into said base member.

10. The protective case of claim 9, wherein each hinge alcove is recessed from a top or bottom edge of said base member, an amount that is about ten times said uniform standard thickness.

11. The protective case of claim 9, wherein said information storage medium tray is hingeably connected to said base member between said pair of hinge alcoves.

12. The protective case of claim 9, wherein said information storage medium tray has a hub which has a height sufficient to centrally support said upper panel so that it is less easily deformed to the point of cracking.

13. The protective case of claim 9, wherein said information storage medium tray has a circular protector ring, which surrounds a disc storage space and has a height sufficient to support said upper panel so that is less easily deformed to the point of cracking.

14. The protective case of claim 9, wherein said lid member is hingeably connected to said base member via a pair of spaced-apart studs located on one member, each of which engages one of a pair of spaced-apart apertures located in the other member.

15. The protective case of claim 9, wherein:
- certain intersecting panels of said base member form a generally perimetric wall adjacent the outer edges thereof, to wit, said rear edge, top edge, bottom edge and a front edge;
- certain intersecting panels of said lid member form lateral top and bottom walls; and
- when said lid member is closed over said base member, said perimetric wall overlaps said lateral top and bottom walls.

16. The protective case of claim 9, wherein said polymeric material is optically transparent polystyrene.

17. The protective case of claim 9, wherein said media tray includes a plurality of lid member support posts that support the rear edge of the lid member when the latter is closed over the base member.

18. The protective case of claim 9, wherein each hinge arm is of a thickness that is substantially less than the thickness of the protective case.

* * * * *